United States Patent
Smithson et al.

(10) Patent No.: US 9,132,506 B2
(45) Date of Patent: Sep. 15, 2015

(54) LASER MARKING PROCESS AND ARTICLES

(75) Inventors: Robert L. W. Smithson, Mahtomedi, MN (US); Jeffrey O. Emslander, Stillwater, MN (US); Danny L. Fleming, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 147 days.

(21) Appl. No.: 14/000,224

(22) PCT Filed: Feb. 27, 2012

(86) PCT No.: PCT/US2012/026680
§ 371 (c)(1),
(2), (4) Date: Aug. 19, 2013

(87) PCT Pub. No.: WO2012/121910
PCT Pub. Date: Sep. 13, 2012

(65) Prior Publication Data
US 2013/0337213 A1  Dec. 19, 2013

Related U.S. Application Data

(60) Provisional application No. 61/449,597, filed on Mar. 4, 2011.

(51) Int. Cl.
*B23K 26/18* (2006.01)
*B23K 26/00* (2014.01)
*B41M 5/26* (2006.01)

(52) U.S. Cl.
CPC .............. *B23K 26/18* (2013.01); *B23K 26/009* (2013.01); *B23K 26/0054* (2013.01);
(Continued)

(58) Field of Classification Search
CPC ........... B41M 5/267; Y10T 428/24868; Y10T 428/31909; Y10T 428/14; Y10T 428/1476; B23K 26/0054; B23K 26/18; B23K 26/0063; B23K 26/009; B23K 26/0057
See application file for complete search history.

(56) References Cited

U.S. PATENT DOCUMENTS

RE24,906 E   12/1960 Ulrich
4,181,752 A   1/1980 Martens et al.
(Continued)

FOREIGN PATENT DOCUMENTS

CN   1669719   8/2005
CN   101104349   1/2008
(Continued)

*Primary Examiner* — Patricia L Nordmeyer
(74) *Attorney, Agent, or Firm* — James A. Baker

(57) ABSTRACT

A process to mark a multilayered article having a release layer and an adhesive layer, using a laser to produce markings within more than one layer of the article. The process includes providing a multilayered article including a laser-markable release liner having a release layer, and a laser-markable adhesive film; and marking the laser-markable release liner and the laser-markable adhesive film by directing laser radiation from at least a first source of laser radiation into the multilayered article through at least the first release layer to induce an interaction between a first light-sensitive pigment and a first organic polymer in the laser-markable release liner, and a second light-sensitive pigment and a second organic polymer in the laser-markable adhesive film, to form at least one visually perceptible marking in each of the laser-markable release liner and the laser-markable adhesive film. The release layer is substantially transparent to the laser radiation. Multilayered articles having multi-layer laser markings are also disclosed.

20 Claims, 3 Drawing Sheets

(52) U.S. Cl.
CPC ........ *B23K 26/0057* (2013.01); *B23K 26/0063* (2013.01); *B41M 5/267* (2013.01); *Y10T 428/14* (2015.01); *Y10T 428/1476* (2015.01)

(56) References Cited

U.S. PATENT DOCUMENTS

| | | |
|---|---|---|
| 4,472,480 A | 9/1984 | Olson |
| 4,818,610 A | 4/1989 | Zimmerman et al. |
| 4,830,910 A | 5/1989 | Larson |
| 4,968,766 A | 11/1990 | Kendziorski |
| 5,206,075 A | 4/1993 | Hodgson, Jr. |
| 5,843,547 A | 12/1998 | Külper et al. |
| 6,660,354 B2 | 12/2003 | Suwa et al. |
| 6,679,968 B2 | 1/2004 | Chen |
| 6,982,107 B1 | 1/2006 | Hennen |
| 7,345,123 B2 | 3/2008 | Qiu et al. |
| 8,771,919 B2 * | 7/2014 | Wu et al. ............... 430/270.1 |
| 2003/0017308 A1 | 1/2003 | Chen |
| 2007/0098900 A1 | 5/2007 | Abe et al. |
| 2012/0164419 A1 | 6/2012 | Sakagami et al. |

FOREIGN PATENT DOCUMENTS

| | | |
|---|---|---|
| EP | 1 146 392 | 10/2001 |
| WO | WO 0212411 A1 * | 2/2002 |
| WO | 2009/136598 A1 | 11/2009 |
| WO | 2010/095747 | 8/2010 |
| WO | 2011/026106 | 3/2011 |

* cited by examiner

LASER MARKING PROCESS AND ARTICLES

CROSS REFERENCE TO RELATED APPLICATION

This application claims the benefit of U.S. Provisional Patent Application No. 61/449,597, filed Mar. 4, 2011, the disclosure of which is incorporated by reference herein in its entirety.

The present invention relates to processes for laser-marking and to laser-marked multilayer articles.

BACKGROUND

Laser marking of polymer substrates is known. In some articles, a single layer in a multilayered substrate is marked by passing laser light through one or more layers that are "transparent" to the wavelength(s) of light generated by the laser. The substrate layer sensitive to the laser may simply char upon contact with the wavelength(s) of light emitted by the laser. In some instances, the markable layer can comprise a laser-sensitive pigment, dye or the like. However, the aforementioned "transparent" layers can still be damaged or modified in some way when exposed to the energy of the laser. Mild damage is often of no serious consequence where the transparent layer is merely decorative or serves a protective function for one or more underlying layers.

The exposure of multilayered substrates to laser light is more problematic where specific layers of materials possess performance properties important to the finished product, and the art has sought to avoid exposing such materials to laser light during the marking of another layer in the article. Layers of adhesive(s), release agent(s), or the like are exemplary of the functional materials which are not normally exposed to laser irradiation during such a marking process.

Additionally, traditional printing methods have not been satisfactory when used on layered materials that include, for example, a release agent. The application of a printed image to the surface of a layer of release agent is typically complicated by poor wetting and/or poor adhesion and can adversely impact the ability of the release agent to adhere to or to release from a pressure sensitive adhesive. Moreover, printing onto a surface prior to the application of a release agent can add steps to the manufacturing process and can adversely impact the ability of the release agent to adhere to the printed surface.

SUMMARY

It is desirable to provide a laser-marking process for marking multiple layers in a multilayered articles. It is especially desirable to provide a process that performs the laser-marking through one or more functional materials to mark an underlying material without damaging the performance of the functional materials in the finished product. It is also desirable to provide laser-marked articles made according to the aforementioned process. Thus, in exemplary embodiments, the present disclosure addresses the above-noted problems by providing a process for laser-marking and laser-marked articles, some exemplary embodiments of which are described herein.

In a first aspect, the disclosure describes a process, comprising:

providing a multilayered article comprising a laser-markable release liner further comprising a first laser-markable layer comprised of at least a first organic polymer and at least a first light-sensitive pigment, a first release layer associated with an external major surface of the laser-markable release liner and comprised of at least one release agent, and a second release layer comprised of at least one release agent and associated with a second major surface of the laser-markable release liner opposite the first release layer; and a laser-markable adhesive film further comprising a second laser-markable layer comprised of at least a second organic polymer and at least a second light-sensitive pigment, and an adhesive layer comprising at least one pressure sensitive adhesive associated with a major surface of the laser-markable adhesive film, wherein the adhesive layer is positioned between the laser-markable release liner and the second laser-markable layer, further wherein the second release layer is interposed between the first laser markable layer and the adhesive layer; and laser-marking the laser-markable release liner and the laser-markable adhesive film by directing laser radiation from a first source of laser radiation into the multilayered article through at least the first release layer to induce an interaction between the first light-sensitive pigment and the first organic polymer in the laser-markable release liner, and the second light-sensitive pigment and the second organic polymer in the laser-markable adhesive film, to form at least one visually perceptible marking in each of the laser-markable release liner and the laser-markable adhesive film, the first release layer and the second release layer being substantially transparent to the laser radiation.

In another aspect, the present disclosure describes a process, comprising:

providing a multilayered article comprising a laser-markable release liner further comprising a first laser-markable layer comprised of at least a first organic polymer and at least a first light-sensitive pigment, a first release layer associated with an external major surface of the laser-markable release liner and comprised of at least one release agent, and a second release layer comprised of at least one release agent and associated with a second major surface of the laser-markable release liner opposite the first release layer; and a laser-markable adhesive film further comprising a second laser-markable layer comprised of at least a second organic polymer and at least a second light-sensitive pigment, and an adhesive layer comprising at least one pressure sensitive adhesive associated with a major surface of the laser-markable adhesive film, wherein the adhesive layer is positioned between the laser-markable release liner and the second laser-markable layer, further wherein the second release layer is interposed between the first laser markable layer and the adhesive layer; and laser-marking the laser-markable release liner by directing laser radiation from a first source of laser radiation into the multilayered article through the first release layer to induce an interaction between the first light-sensitive pigment and the first organic polymer in the laser-markable release liner to form at least one visually perceptible marking in the laser-markable release liner, the first release layer being substantially transparent to the laser radiation from the first source of laser radiation; and laser-marking the laser-markable adhesive film by directing laser radiation from a second source of laser radiation into the multilayered article through the laser-markable adhesive film to induce an interaction between the second light-sensitive pigment and the second organic polymer in the laser-markable adhesive film to form at least one visually perceptible marking in the laser-markable adhesive film, the laser-markable adhesive film being transparent to at least a portion of the laser radiation from the second source of laser radiation.

In some exemplary embodiments of the latter aspect, the at least one visually perceptible marking in the laser-markable release liner is not formed in registration with the at least one visually perceptible marking in the laser-markable adhesive film. In some particular exemplary embodiments, the laser radiation from the first source of laser radiation comprises electromagnetic radiation comprising a wavelength of about 355 nm, and the laser radiation from the second source of laser radiation comprises electromagnetic radiation comprising a wavelength of about 532 nm.

In other exemplary embodiments of any of the foregoing aspects, the at least one visually perceptible marking in the laser-markable release liner is formed in registration with the at least one visually perceptible marking in the laser-markable adhesive film. In certain exemplary embodiments, at least one of the at least one visually perceptible marking in the laser-markable release liner or the at least one visually perceptible marking in the laser-markable adhesive film comprises a plurality of markings.

In additional exemplary embodiments of the foregoing aspects and embodiments, the process includes rolling the multilayered article into a rolled configuration so that the at least one pressure sensitive adhesive becomes releasably adhered to the first release layer, wherein the at least one pressure sensitive adhesive is more firmly adhered to the second release layer.

In other exemplary embodiments of the foregoing aspects and embodiments, one or both of the first light sensitive pigment and the second light sensitive pigment comprises metal oxide particles selected from titanium dioxide, tin oxide, indium tin oxide, and combinations thereof. In some exemplary embodiments, one or both of the first organic polymer and the second organic polymer is selected from the group consisting of polyethylene terephthalate, polyolefin, thermoplastic elastomeric olefin and combinations thereof. In certain exemplary embodiments, at least one of the at least one release agent of the first release layer, or the at least one release agent of the second release layer, comprises a material selected from the group consisting of polyolefin, silicones, fluorosilicones, perfluoroethers, fluorocarbons, polymers with long alkyl side chains, and combinations of two or more of the foregoing.

In certain presently preferred exemplary embodiments, the first release layer comprises a first polyolefin release agent, and the second release layer comprises a second polyolefin release agent different from the first polyolefin release agent. In some particular presently preferred exemplary embodiments, the first release layer comprises low density polyethylene, the first organic polymer comprises high density polyethylene, and the second release layer comprises medium density polyethylene. Optionally, both the first light-sensitive pigment and the second light sensitive pigment comprise titanium dioxide.

In additional exemplary embodiments of any of the foregoing, the multilayered article comprises a material selected from the group consisting of nonwoven materials, woven materials, cellulosic materials, films and combinations of two or more of the foregoing. In some exemplary embodiments, the first light sensitive pigment comprises titanium dioxide present at a concentration of less than about 1.5% by weight based on the combined weight of the first organic polymer and the first light-sensitive pigment.

In some particular exemplary embodiments of the foregoing, the laser radiation from the first source of laser radiation comprises electromagnetic radiation comprising a wavelength of about 355 nm. In other particular exemplary embodiments, the laser radiation from the first source of laser radiation comprises electromagnetic radiation comprising a wavelength of about 532 nm. In further exemplary embodiments, the visually perceptible marking provides an indicia of source, and wherein the multilayered article is useful as a self-adhesive film.

In another aspect, the disclosure describes an article comprising a self-adhesive article made according to any one of the preceding aspects or embodiments, optionally wherein the article is a self-adhesive graphic film.

In a further aspect, the disclosure describes a multilayered article comprising:

a laser-markable release liner further comprising a first laser-markable layer comprised of at least a first organic polymer and at least a first light-sensitive pigment, a first release layer associated with an external major surface of the laser-markable release liner and comprised of at least one release agent, and a second release layer comprised of at least one release agent and associated with a second major surface of the laser-markable release liner opposite the first release layer, the first release layer being substantially transparent to the laser radiation; and a laser-markable adhesive film further comprising a second laser-markable layer comprised of at least a second organic polymer and at least a second light-sensitive pigment, and an adhesive layer comprising at least one pressure sensitive adhesive associated with a major surface of the laser-markable adhesive film, wherein the adhesive layer is positioned between the laser-markable release liner and the second laser-markable layer, further wherein the second release layer is interposed between the first laser markable layer and the adhesive layer, wherein the laser-markable release liner and the laser-markable adhesive film each include at least one visually perceptible marking.

In some exemplary embodiments of the foregoing multilayered article aspect, the at least one visually perceptible marking of the laser-markable release liner is in registration with the at least one visually perceptible marking of the laser-markable adhesive layer. In other exemplary embodiments, the at least one visually perceptible marking of the laser-markable release liner is not in registration with the at least one visually perceptible marking of the laser-markable adhesive layer.

Various aspects and advantages of exemplary embodiments of the exemplary embodiments of the present disclosure have been summarized. The above Summary is not intended to describe each illustrated embodiment or every implementation of the exemplary embodiments of the present disclosure. The presently disclosed invention will be more fully appreciated by those of ordinary skill in the art upon consideration of the various exemplary embodiments disclosed herein including the presently preferred embodiments that are specifically described in the Drawings, the Detailed Description, and the appended Claims.

BRIEF DESCRIPTION OF THE DRAWINGS

In describing exemplary embodiments of the disclosure, reference is made to the Drawings wherein various features are identified and described using reference numerals as shown on the following Figures, with like numerals indicating like features, and wherein.

Figure 1A:
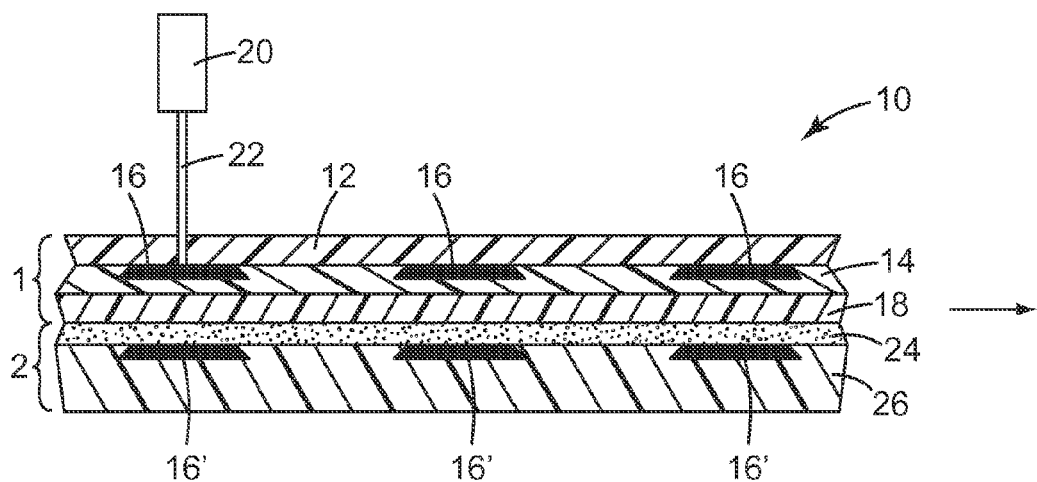
FIG. 1A is a schematic side view of an arrangement for selectively laser-marking a multilayered sheet according to one exemplary embodiment of the present disclosure.

Although the embodiments are described herein with reference to the Figures, it will be appreciated that the presently disclosed invention is not limited to the depicted embodiments, and that the Figures and features depicted therein are not to scale unless otherwise indicated.

DETAILED DESCRIPTION

Unless otherwise indicated, scientific and technical terms used herein have meanings commonly used in the art unless otherwise specified. The definitions provided herein are to facilitate understanding of certain terms used frequently herein and are not meant to limit the scope of the present disclosure.

GLOSSARY

In this application:

High-density polyethylene (HDPE) is a polyethylene thermoplastic having a density greater than about 0.940 g/cm$^3$.

Medium-density polyethylene (MDPE) is a polyethylene thermoplastic having a density within the range of 0.926-0.940 g/cm$^3$.

Low-density polyethylene (LDPE) is a polyethylene thermoplastic having a density less than about 0.926 g/cm$^3$.

Release Agent is a low surface energy material which, when applied to a surface of a disposable liner, provides a low surface energy interface between the liner and a pressure sensitive adhesive (PSA).

Release liner is a component of a pressure sensitive adhesive product which includes on one or both major surfaces a release agent and functions as a carrier to protect a surface of an adhesive. Liners can be extruded plastic films and can be made out of one single type of plastic material, a blend of different plastic materials or a multilayered coextrusion. As used herein, the terms "release liner," "liner," "release film" and "release sheet" are interchangeable.

Pressure sensitive adhesive (PSA) is adhesive which forms a bond with the application of relatively light pressure to marry the adhesive with an adherend.

Laser is an acronym for "light amplification by stimulated emission of radiation" and refers to a device that emits light (electromagnetic radiation) through a process called stimulated emission.

Laser radiation refers to the light emitted by a laser.

Laser marking refers to the use of laser radiation to create a visually perceptible image in a material, an article or a component thereof.

Various exemplary embodiments of the disclosure will now be described with particular reference to the Drawings.

Embodiments of the present disclosure may take on various modifications and alterations without departing from the spirit and scope of the disclosure. Accordingly, it is to be understood that the embodiments of the present disclosure are not to be limited to the following described exemplary embodiments, but is to be controlled by the limitations set forth in the claims and any equivalents thereof.

Marks generally, and more particular laser-made markings, have been used to identify products and carry a message of brand to customers. Conversely, the absence of a mark carries no indication of product source or origin, let alone brand, which creates an opportunity for product counterfeiting and ambiguities regarding product warranties when a product cannot be positively identified as to source of origin. Marked articles which rely on special constructions which provide an indication of tampering, or which have a unique appearance, can also provide security value, for example, as validation marks in government documents (e.g. passports, visa, identification cards, driver's licenses, and the like), as security features in credit or gift cards, or as tamper indicators on shipments or product packaging.

This disclosure describes a process for making two or more laser marks simultaneously in different layers of a multilayer article. Furthermore, these marks can be separated from each other when the multilayer article is a multilayer film construction adapted to be separated at the interface between a release layer and an adhesive layer separating the marked layers. Such markings can provide benefit in at least two ways.

First, the markings can mark the adhesive film product and the release liner which is protecting the adhesive, for example in a self-adhesive graphic film. The mark in the release liner can provide the above referenced product identification and brand information. The mark(s) in the release liner would normally be visible on the exterior surface of the release liner before separating the release liner from the self-adhesive graphic film when applying the graphic film to another surface. However, in some exemplary embodiments, it could be advantageous if the mark(s) in the release liner are made in a manner such that the mark(s) only become visible after separating the release liner from the adhesive layer.

The mark(s) in the adhesive film could be used to provide positioning or registration guidance when viewed through the film surface (preferably with some amount of back-lighting through the adhesive layer) to facilitate application of the adhesive film to a surface. In some exemplary embodiments, it could be advantageous if the mark(s) in the adhesive film are made in a manner such that the mark(s) become visible only after separating the release liner from the adhesive layer, and thereafter become invisible after applying the adhesive film to another substrate.

Alternatively or additionally, the mark(s) in the adhesive film could provide product identification and brand information after the adhesive graphic film was applied to another surface (e.g. a sign, a vehicle, a package, a document, or some other substrate for the graphic film). The mark(s) in the adhesive film thus could remain visible on the adhesive film applied to a substrate surface. This feature could be useful in dealing with questions about warranty work, or provide other useful information about the product (e.g. production run number, factory location, production date, and the like).

Second, the markings can mark the adhesive film product and can mark the release liner which is protecting the adhesive, for example, as a security mark on a sticker, label or tape applied to a substrate (e.g. a package, passport, and the like). The mark(s) in the adhesive film can provide the above referenced information regarding product source of origin and/or brand. Furthermore, in some exemplary embodiments, in addition or in place of such information, a validation code or other similar security marking could advantageously be provided for the substrate to which the adhesive film is applied (e.g., the substrate could be marked for the day of use, or the time period for which it was valid). The mark provided in the release liner could be similarly read before and/or after separating the release liner from the adhesive film.

Thus, in various exemplary embodiments, the present disclosure provides laser-marked multilayered articles and a process for making such articles using a laser. In various embodiments described herein, laser marking provides a visually perceptible image (e.g., a logo, trademark, company name, etc.) in at least two layers of a multilayered article by creating one or more marked areas resulting from a laser-induced interaction between a laser-sensitive pigment and a polymer in which the pigment is dispersed. In specific embodiments, the process uses a laser to mark at least two inner polymer layers within a multilayered article, wherein at least one layer of the article comprises a release agent. In such exemplary embodiments, the laser penetrates through the release agent to mark the aforementioned polymer layers without causing substantial damage to the release properties of the release agent in the release layer.

In some exemplary embodiments, the outermost layer(s) of the release liner comprises release agent(s). In such embodiments, the release liners may be marked to include visually perceptible indicia of source (e.g., a logo, trademark, company name, fanciful design, advertisement(s), product instructions, barcode or the like). When applied to a layer of a pressure sensitive adhesive (PSA), the laser-marked areas on the release liner generally remains visible.

Any attempt to separate the liner from the adhesive film, and subsequently rejoin the adhesive film to the separated liner (or another liner material), could be readily detected by misregistration of the mark(s) in the release liner relative to the corresponding mark(s) in the adhesive film. The utility of such a multilayer film could, for example, lie in the ability to readily detect counterfeiting or substitution of the adhesive film relative to another that attempting to replace the film with the first marks in registration to the second marks would be difficult (i.e., re-use of the product would be readily detectable as misregistration of the marking(s) in the release liner with the marking(s) in the adhesive film. Further value could lie in the ability to readily detect counterfeiting resulting from use of an unmarked (i.e. counterfeit) release liner (or adhesive film) with a properly marked (i.e. non-counterfeit) adhesive film (or release liner).

Referring now to the Drawings, FIG. 1A schematically depicts an embodiment of a laser marking process according to the present disclosure. Laser-markable sheet or article 10 is conveyed in a single direction (e.g., indicated by the arrow to the right of the drawing) underneath a first laser source 20 which emits a radiation of laser radiation 22 comprising a wavelength of light effective for creating the described marking. In some embodiments, article 10 is a continuous sheet of material conveyed to the laser source 20 from an unwind roll (not shown), for example. In other embodiments, the article 10 may comprise discrete or discontinuous pieces of material.

As shown in FIG. 1A, in one exemplary embodiment, the process comprises:

providing a multilayered article 10 comprising a laser-markable release liner 1 further comprising a first laser-markable layer 14 comprised of at least a first organic polymer and at least a first light-sensitive pigment, a first release layer 12 associated with an external major surface of the laser-markable release liner 1 and comprised of at least one release agent, and a second release layer 18 comprised of at least one release agent and associated with a second major surface of the laser-markable release liner 1 opposite the first release layer 12; and a laser-markable adhesive film 2 further comprising a second laser-markable layer 26 comprised of at least a second organic polymer and at least a second light-sensitive pigment, and an adhesive layer 24 comprising at least one pressure sensitive adhesive associated with a major surface of the laser-markable adhesive film 2, wherein the adhesive layer 24 is positioned between the laser-markable release liner 1 and the second laser-markable layer 26, further wherein the second release layer 18 is interposed between the first laser markable layer 14 and the adhesive layer 24; and laser-marking the laser-markable release liner 1 and the laser-markable adhesive film 2 by directing laser radiation 22 from a first source of laser radiation 20 into the multilayered article 10 through at least the first release layer 12 to induce an interaction between the first light-sensitive pigment and the first organic polymer in the laser-markable release liner, and the second light-sensitive pigment and the second organic polymer in the laser-markable adhesive film, to form at least one visually perceptible marking (16, 16') in each of the laser-markable release liner 1 and the laser-markable adhesive film 2, the first release layer 12 and the second release layer 18 being substantially transparent to the laser radiation.

Figure 1B:
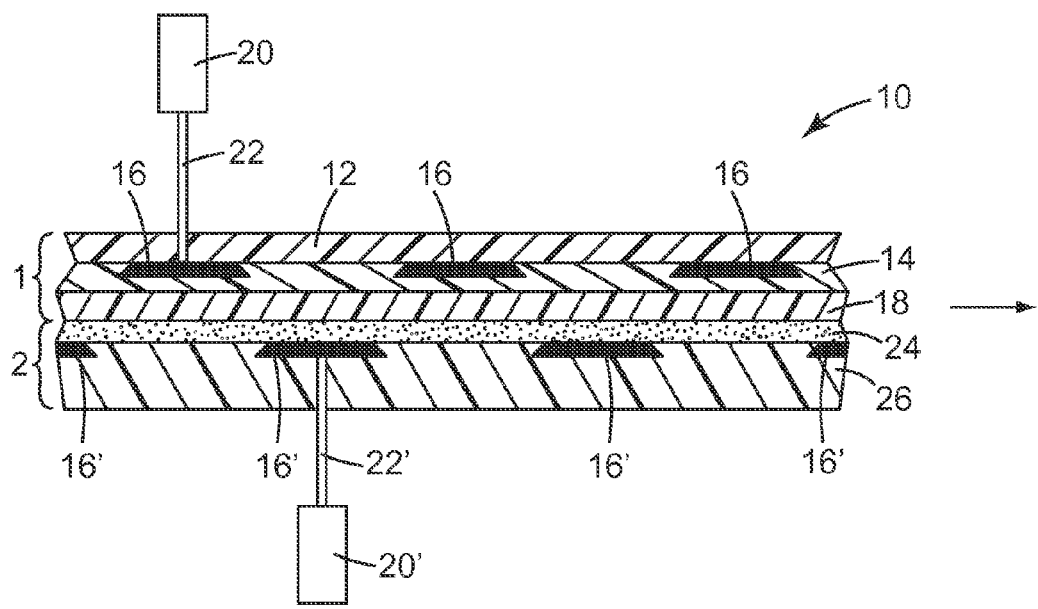
FIG. 1B is a schematic side view of an arrangement for selectively laser-marking a multilayered sheet according to another exemplary embodiment of the present disclosure.

In an alternate arrangement illustrated by FIG. 1B, the laser-markable layer 26 may be marked using a laser mounted beneath the multilayered article 10. Thus, in another exemplary embodiment shown in FIG. 1B, the process comprises:

providing a multilayered article 10 comprising a laser-markable release liner 1 further comprising a first laser-markable layer 14 comprised of at least a first organic polymer and at least a first light-sensitive pigment, a first release layer 12 associated with an external major surface of the laser-markable release liner 1 and comprised of at least one release agent, and a second release layer 18 comprised of at least one release agent and associated with a second major surface of the laser-markable release liner 1 opposite the first release layer 12; and a laser-markable adhesive film 2 further comprising a second laser-markable layer 26 comprised of at least a second organic polymer and at least a second light-sensitive pigment, and an adhesive layer 24 comprising at least one pressure sensitive adhesive associated with a major surface of the laser-markable adhesive film 2, wherein the adhesive layer 24 is positioned between the laser-markable release liner 1 and the second laser-markable layer 26, further wherein the second release layer 18 is interposed between the first laser markable layer 14 and the adhesive layer 24; and laser-marking the laser-markable release liner 1 by directing laser radiation 22 from a first source of laser radiation 20 into the multilayered article 10 through the first release layer 12 to induce an interaction between the first light-sensitive pigment and the first organic polymer in the laser-markable release liner 1 to form at least one visually perceptible marking 16 in the laser-markable release liner 1, the first release layer 12 being substantially transparent to the laser radiation 22 from the first source of laser radiation 20; and laser-marking the laser-markable adhesive film 2 by directing laser radiation 22' from a second source of laser radiation 20' into the multilayered article 10 through the laser-markable adhesive film 2 to induce an interaction between the second light-sensitive pigment and the second organic polymer in the laser-markable adhesive film 2 to form at least one visually perceptible marking 16' in the laser-markable adhesive film 2, the laser-markable adhesive film 2 being transparent to at least a portion of the laser radiation 22' from the second source of laser radiation 20'.

In some exemplary embodiments illustrated by FIG. 1B, the at least one visually perceptible marking 16 in the laser-markable release liner 1 is not formed in registration with the at least one visually perceptible marking 16' in the laser-markable adhesive film 2. In some particular exemplary embodiments, the laser radiation 22 from the first source of laser radiation 20 comprises electromagnetic radiation comprising a wavelength of about 355 nm, and the laser radiation 22' from the second source of laser radiation 20' comprises electromagnetic radiation comprising a wavelength of about 532 nm.

In other exemplary embodiments illustrated by FIG. 1A, the at least one visually perceptible marking 16 in the laser-markable release liner 1 is formed in registration with the at least one visually perceptible marking 16' in the laser-markable adhesive film 2. In certain exemplary embodiments, at least one of the at least one visually perceptible marking 6 in the laser-markable release liner 1 or the at least one visually perceptible marking 16' in the laser-markable adhesive film 2 comprises a plurality of markings, as shown in FIGS. 1A-1B.

The processes of FIGS. 1A and 1B may be practiced using a multilayered article 10 that is provided as a continuous sheet or roll (e.g. a web) or as discontinuous pieces of material. In the process of FIG. 1A, laser radiation 22 is directed from laser radiation source 20 to both the laser-markable layer 14 of release liner 1, and the laser markable layer of adhesive film 2, thereby initiating an interaction between the organic polymer and laser-sensitive pigment to create laser-marked areas 16 and 16'. In such an arrangement, second release layer 18 (e.g., a release agent) is selected to be substantially transparent to the laser, as previously discussed.

In the process of FIG. 1B, laser radiation 22 is directed from laser radiation source 20 only to the laser-markable layer 14 of release liner 1, thereby initiating an interaction between the organic polymer and laser-sensitive pigment to create laser-marked area 16; and laser radiation 22' is directed only from laser radiation source 20' to the laser-markable layer 26 of adhesive film 2, thereby initiating an interaction between the organic polymer and laser-sensitive pigment to create laser-marked area 16'.

While not intending to be bound by theory, it is believed that the aforementioned interaction may be a chemical reaction between the pigment and the surrounding polymer resulting in a product with laser-marked areas 16 in the form of indicia visible to the human eye. The laser-marked areas are typically darker in appearance than the surrounding portions of the same layer that comprise unreduced/unreacted pigment and polymer. Other additives or components may be present in the laser-markable layer 14 such as dyes or colorants and other components that are not considered to be sensitive to laser radiation.

Multilayered article 10 includes at least one top release layer 12 coated over the underlying laser-markable layer 14, the first (i.e. external) release layer 12 being substantially transparent to the laser radiation 22 at the write wavelength. "Transparent," as used in this context, refers to a material that has little or minimal interaction with the laser. Laser radiation (e.g., radiation 22) will pass through the transparent release material with little to no observable damage to that material.

Second release layer 18 may comprise a layer of release agent which may be the same as or different than the release agent of first (external) release layer 12. The release agent(s) and the laser are selected to be compatible in that exposure to the laser does not materially affect the ability of the release agent to function. In other words, the release agent is not functionally damaged by exposure to laser radiation. Well known peel force measurement (as known in the art) provide one method for determining whether a release agent's release properties are significantly changed after exposure to a laser.

When the aforementioned peel force measurement is used, release agents used in embodiments of the present disclosure may experience a moderate initial change in peel strength following exposure to a laser, but will still function in a manner acceptable to those of ordinary skill in the art. In embodiments where a change in peel strength from release agent is observed, the change will typically be no more that about 500%, or no more than about 100% and in some embodiments no more than about 10%. In other words, the peel strength for a release agent following exposure to laser radiation is no more than about 600% of its initial value, in some embodiments no more than about 200%, and in some embodiments, no more than about 110%.

Figure 2:
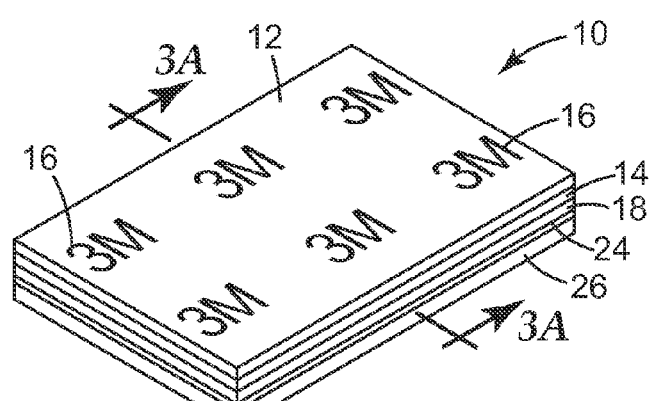
FIG. 2 is a perspective view of a portion of a multilayered film that has been laser-marked according to a another exemplary embodiment of the present disclosure.

Referring now to FIG. 2, a laser-marked multilayered article 10 is depicted in a perspective view. In the depicted embodiment, multilayered article 10 is similar to article 10 of FIG. 1A, and comprises a multilayered sheet comprising a first laser-markable layer 14, a first release layer 12 associated with an external major surface of the laser-markable release liner 1 (FIG. 1A), and a second release layer 18 associated with a second major surface of the laser-markable release liner 1 (FIG. 1A) opposite the first release layer 12; a second laser-markable layer 26, and an adhesive layer 24 associated with a major surface of the laser-markable adhesive film 2 (FIG. 1A), wherein the adhesive layer 24 is positioned between the laser-markable release liner 1 (FIG. 1A) and the second laser-markable layer 26, further wherein the second release layer 18 is interposed between the first laser markable layer 14 and the adhesive layer 24.

Each of the marked areas 16 is the result of a laser-induced interaction of materials within the laser-markable layer 14. In FIG. 2, laser-marked areas 16 are depicted in the form of the brand "3M" owned by 3M Company, St. Paul, Minn. First release layer 12 (which is shown as the top layer) comprises material that is transparent to the laser radiation, as previously described. Moreover, first release layer 12 is visually or optically transparent in the sense that the marked areas 16 in laser-markable layer 14 are observable through the top layer 12.

Figure 3A:
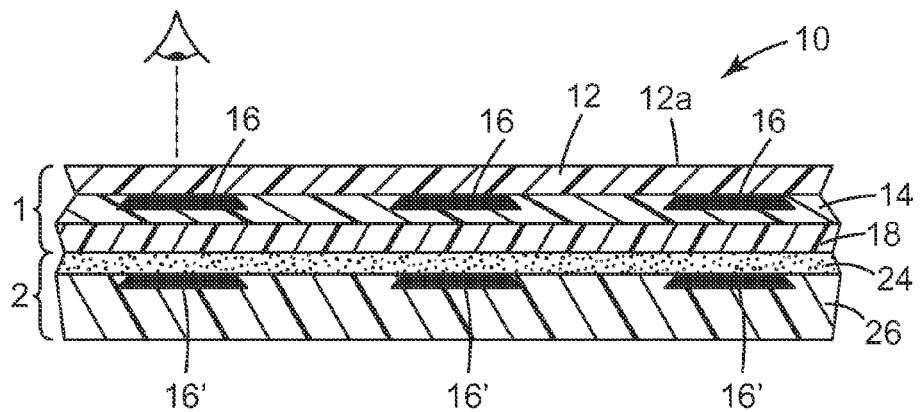
FIG. 3A is a side elevation of the laser-marked multilayered film of FIG. 1.

In another exemplary embodiment, the disclosure describes an article comprising a self-adhesive article 10 made according to any one of the preceding aspects or embodiments, optionally wherein the article is a self-adhesive graphic film. Referring now to FIG. 3A, in one exemplary embodiment, the disclosure describes on exemplary multilayered self-adhesive article comprising:

a laser-markable release liner 1 further comprising a first laser-markable layer 14 comprised of at least a first organic polymer and at least a first light-sensitive pigment, a first release layer 12 associated with an external major surface of the laser-markable release liner 1 and comprised of at least one release agent, and a second release layer 18 comprised of at least one release agent and associated with a second major surface of the laser-markable release liner 1 opposite the first release layer 12, the first release layer 12 and the second release layer 18 being substantially transparent to the laser radiation; and a laser-markable adhesive film 2 further comprising a second laser-markable layer 26 comprised of at least a second organic polymer and at least a second light-sensitive pigment, and an adhesive layer 24 comprising at least one pressure sensitive adhesive associated with a major surface of the laser-markable adhesive film 2, wherein the adhesive layer 24 is positioned between the laser-markable release liner 1 and the second laser-markable layer 26, further wherein the second release layer 18 is interposed between the first laser markable layer 14 and the adhesive layer 24, wherein the laser-markable release liner 1 and the laser-markable adhesive film 2 each include at least one visually perceptible marking 16-16'.

In further exemplary embodiments, the visually perceptible marking(s) 16-16' provide an indicia of source, and the multilayered article is useful as a self-adhesive film.

In the illustrated multilayered article 10 of FIG. 3A, the at least one visually perceptible marking 16 of the laser-markable release liner 1 is shown in registration with the at least one visually perceptible marking 16' of the laser-markable adhesive layer 2. However, it should be understood that it is also within the scope of this embodiment to provide the at least one visually perceptible marking 16 of the laser-markable release liner 1 out of registration with the at least one visually perceptible marking 16' of the laser-markable adhesive layer 2, as illustrated in FIG. 1B.

Figure 3B:
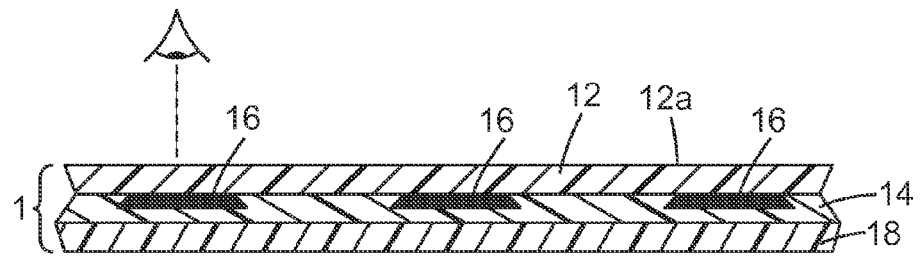
FIG. 3B is a side elevation of an exemplary laser-marked release liner after separation from the laser-marked adhesive film of the laser-marked multilayered film of FIG. 1A.

FIG. 3B shows the laser-markable release liner 1 of FIG. 3A after separation from the laser-markable adhesive film 2 (FIG. 1A). The laser-markable release liner comprises a first laser-markable layer 14, a first release layer 12 associated with an external major surface 12a of the laser-markable release liner 1, and a second release layer 18 associated with a second major surface of the laser-markable release liner 1 opposite the first release layer 12. The at least one visually perceptible marking 16 of the laser-markable release liner 1 is shown as being visible when viewed through the first release layer 12; however, it is to be understood that the at least one visually perceptible marking 16 of the laser-markable release liner 1 may be visible when viewed through the second release layer 18, provided the second release layer 18 is chosen to be substantially transparent, or semi-transparent and back-lit.

Figure 3C:
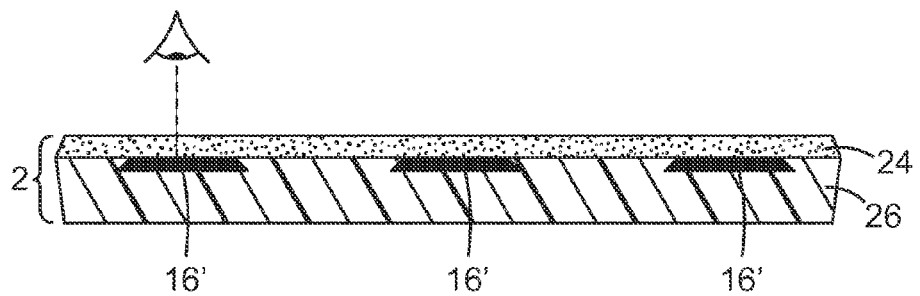
FIG. 3C is a side elevation of an exemplary laser-marked adhesive film after separation from the laser-marked release liner of the laser-marked multilayered film of FIG. 1A.

FIG. 3C shows the laser-markable adhesive film 2 of FIG. 3A after separation from the laser-markable release liner 1 (FIG. 1A). The laser-markable adhesive film 2 comprises a second laser-markable layer 26, and an adhesive layer 24 associated with a major surface of the laser-markable adhesive film 2. The at least one visually perceptible marking 16' of the laser-markable adhesive film 2 is shown as being visible when viewed through the adhesive layer, provided that the adhesive layer 24 is chosen to be substantially transparent. Furthermore, it is to be understood that the at least one visually perceptible marking 16' of the laser-markable adhesive film may be visible when viewed through the second laser-markable layer 26, provided the second laser-markable layer 26 is chosen to be substantially transparent, or semi-transparent and back-lit.

Figure 4:
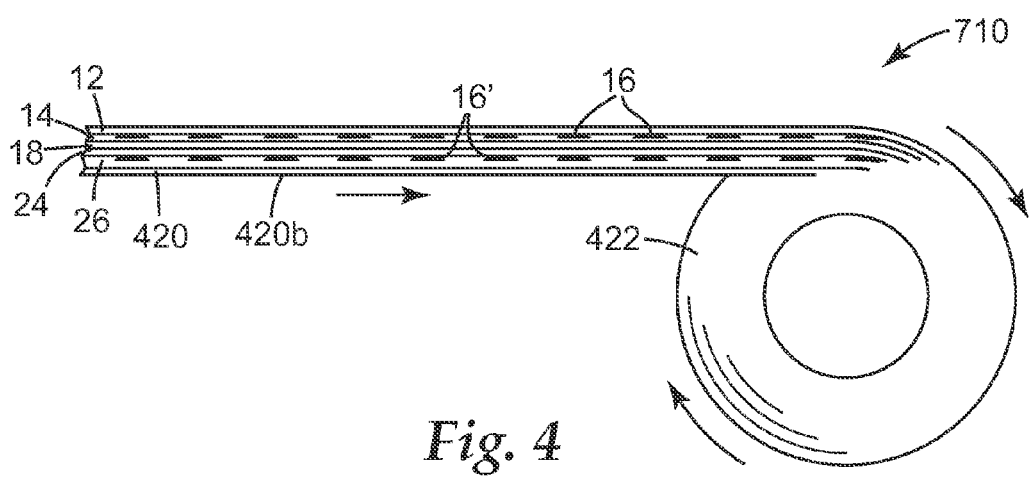
FIG. 4 is a side elevation of an exemplary laser-marked multilayered film illustrating an exemplary rolling operation.

In an additional exemplary embodiment illustrated by FIG. 4, the process includes rolling the multilayered article 710 into a rolled configuration 422, so that the at least one pressure sensitive adhesive becomes releasably adhered to the first release layer 12, wherein the at least one pressure sensitive adhesive is more firmly adhered to the second release layer 18. The rolled multilayered article 710 is similar to article 10 of FIG. 1A, and comprises a multilayered sheet comprising a first laser-markable layer 14, a first release layer 12 associated with an external major surface of the laser-markable release liner 1 (FIG. 1A), and a second release layer 18 associated with a second major surface of the laser-markable release liner 1 (FIG. 1A) opposite the first release layer 12; a second laser-markable layer 26, and an adhesive layer 24 associated with a major surface of the laser-markable adhesive film 2 (FIG. 1A), wherein the adhesive layer 24 is positioned between the laser-markable release liner 1 (FIG. 1A) and the second laser-markable layer 26, further wherein the second release layer 18 is interposed between the first laser markable layer 14 and the adhesive layer 24. An optional release liner 420 having a release surface 420b may be provided, if necessary.

It will further be appreciated that additional embodiments are contemplated (but not shown in the Drawings) wherein the multilayered article comprises a plurality of layers having still more material layers than previously described herein. Depending on the properties desired and the end use of the article, any number of such layers may be included in the article so long as the article comprises a laser-markable layer, as previously described, and the layers of material coated over the laser-markable layer are transparent to the laser being used to mark the article.

Suitable materials for use in the laser-markable layers include any of a variety of film-forming organic polymers compatible with a laser-sensitive pigment. In some presently preferred embodiments, one or both of the first organic polymer and the second organic polymer is selected from the group consisting of polyethylene terephthalate, polyolefin, thermoplastic elastomeric olefin and combinations thereof.

Regarding organic polymer materials, any of a variety of thermosetting organic polymers as well as thermoplastic organic polymers may be suitable and are contemplated within the scope of the present disclosure. Polymeric materials suitable for use are discussed below, and it will be appreciated that such materials are often compounded with any of a variety of additives and/or fillers such as plasticizers, anti-degradants, dyes, and the like. In the various embodiments of the present disclosure, the polymeric materials used to form a laser-markable layer are compounded with a measured amount of laser-sensitive pigment (e.g., titanium dioxide), as previously described.

Examples of suitable organic polymers include polyolefin materials such as polyethylene. Suitable polyethylene polymers include low density polyethylene (LDPE), medium density polyethylene (MDPE), high density polyethylene (HDPE) and combinations of two or more of the foregoing. In some embodiments, the laser-markable layer comprises HDPE and the top and bottom layers comprise release agent. In some embodiments, the laser-markable layer again comprises HDPE with top and bottom layers comprising release agent, and intermediate layers comprising LDPE, MDPE or both. In some embodiments, one intermediate layer is LDPE and the other intermediate layer is MDPE.

In some embodiments, suitable organic polymers for use in the laser-markable layer include any film forming polymer so long as it is capable of supporting a layer of release agent. Suitable polymeric films include those made from polyamide (e.g., Nylon); polyesters such as polyethylene terephthalate (PET); polyacetal; polycarbonate and the like are well suited for this application. Polyethylene terephthalate is the most common thermoplastic polyester and is commonly referred to as "polyester."

Variations such as polyethylene naphthalate, polybutylene terephthalate, and copolyesters such as polyethylene terephthalate isophthalate are also suitable for use in various embodiments of the present disclosure. In a broader sense, any polyester film based on a polymer resulting from polycondensation of a glycol or diol with a dicarboxylic acid (or its ester equivalents) such as, for example, terephthalic acid, isophthalic acid, sebacic, malonic, adipic, azelaic, glutaric, suberic, succinic acids or mixture of two or more of the forgoing are suitable for use in the present disclosure. Suitable glycols include, for example, ethylene glycol, diethylene glycols, polyethylene glycols, and polyols such as butanediol and mixtures of two or more of the foregoing.

Polyethylene terephthalate (PET) is widely known in the form of biaxially oriented and thermally stabilized films usually referred to by their main brand names Mylar® (Dupont Teijin Films U.S. Limited Partnership, Chester, Va., 23836), Melinex® (Dupont Teijin Films U.S. Limited Partnership, Chester, Va., 23836), Teijin® (Dupont Teijin Films U.S. Limited Partnership, Chester, Va., 23836), Lumirror® (Toray Plastics (America), Inc., North Kingstown, R.I. 02852) or Hostaphan® (Mitsubishi Polyester Film, Inc., Greer, S.C. 29652), etc. and are commercially available.

Additives may be blended into a polymer resin prior to forming a film or layer by extrusion or the like. In extrusion operations, the additives may be added directly to the extruder. Exemplary additives include fillers such as silica, calcium carbonate, kaolin etc, colorants (e.g., dyes or pigments), slip agents, anti-blocking agents, processing aides, anti-oxidants, antistatic agents, laser-sensitive pigments (e.g., titanium dioxide) and the mixture thereof.

In the various embodiments of the present disclosure, at least one laser-sensitive pigment is substantially homogenously dispersed within the organic polymer of a laser-markable layer. Suitable laser-sensitive pigments include one or more metal oxides such as crystalline (e.g., rutile) titanium dioxide ($TiO_2$), tin oxide, indium tin oxide, and combinations thereof. In certain presently preferred embodiments, one or both of the first light sensitive pigment and the second light sensitive pigment comprises metal oxide particles selected from titanium dioxide, tin oxide, indium tin oxide, and combinations thereof. Preferably, both the first light-sensitive pigment and the second light sensitive pigment comprise titanium dioxide.

Commercially available titanium dioxides are suitable for use in the various embodiments of the present disclosure including those available from E. I. du Pont de Nemours and Company ("DuPont") of Wilmington, Del. In particular, the titanium dioxides available from DuPont under the "Ti-Pure" trademark such as the product designated "Ti-Pure R-902+" may be used. Minor amounts of silica ($SiO_2$), alumina ($Al_2O_3$) and/or aluminum hydroxide may be present in the titanium dioxide. Typically, silica, alumina and/or aluminum hydroxide are present in the form of an outer coating that surrounds each particle of $TiO_2$.

In embodiments wherein titanium dioxide is used as the laser-sensitive pigment, the titanium dioxide is typically present in the organic polymer at a concentration of less than about 10% by weight, based on the total weight of the laser-markable layer. In some exemplary embodiments, titanium dioxide is present in the organic polymer at a concentration less than about 5% by weight, more preferably less than about 1% by weight. In still other embodiments, the titanium dioxide is present at concentrations less than about 0.5% by weight based on the total weight of the laser-markable layer. Higher or lower concentrations of titanium dioxide may also be suitable. In one presently preferred embodiment, the first light sensitive pigment comprises titanium dioxide present at a concentration of less than about 1.5% by weight based on the combined weight of the first organic polymer and the first light-sensitive pigment.

In certain exemplary embodiments, at least one of the at least one release agent of the first release layer, or the at least one release agent of the second release layer, comprises a material selected from the group consisting of polyolefin, silicones, fluorosilicones, perfluoroethers, fluorocarbons, polymers with long alkyl side chains, and combinations of two or more of the foregoing. In certain presently preferred exemplary embodiments, the first release layer comprises a first polyolefin release agent, and the second release layer comprises a second polyolefin release agent different from the first polyolefin release agent. In some particular presently preferred exemplary embodiments, the first release layer comprises low density polyethylene, the first organic polymer comprises high density polyethylene, and the second release layer comprises medium density polyethylene.

In additional exemplary embodiments of any of the foregoing, the multilayered article comprises a material selected from the group consisting of nonwoven materials, woven materials, cellulosic materials, films and combinations of two or more of the foregoing. In some embodiments, materials other than polymer films may be desired for use in the laser-markable layer. Exemplary of such materials include nonwoven substrates, woven substrates, cellulosic materials (e.g., paper), and the like. Fibers suitable for inclusion in such woven and nonwoven materials include the aforementioned polymers as well as cellulosic materials, such as paper. All the above mentioned substrates can be treated before applying the release agent.

In embodiments comprising one or more intermediate layers, the intermediate layers comprise materials that are transparent to the write wavelength of the laser being used to mark the article. While the laser-markable layer comprises laser-sensitive pigment, the intermediate layers typically comprise no laser-sensitive pigment. In some cases, the intermediate layers can provide a thermal buffer or heat barrier between the laser-markable layer and a release agent in the outermost layer(s). In some processes, marking of the laser-markable layer may generate excess heat during the laser-induced interaction between the pigment and organic polymer, and the presence of intermediate layers can provide a thermal buffer to protect against thermal degradation of release agent or adhesive in the outer layers of the article.

In some embodiments, suitable organic polymer for one or more of the layers in a laser-marked article can comprises a thermoplastic elastomeric olefin (TEO). Thermoplastic elastomeric olefins (TEOs), also known in the art as thermoplastic polyolefins (TPOs), are both thermoplastic and elastic in nature. TEO is typically a blend of a rubber material, such as, for example, an ethylene propylene rubber (such as ethylene-propylene monomer [EPM] or ethylene-propylene-diene-monomer [EPDM]), a nitrile rubber, or a styrene butadiene rubber, combined with a thermoplastic (such as polypropylene, polyethylene, or polyvinyl chloride), and may also be compounded with any of a variety of additives and/or fillers such as plasticizers, antidegradants, fillers, dyes, and the like.

TEO is commercially available, typically as a blend of polypropylene and EPDM. Alternatively, the TEO can be formed by copolymerizing thermoplastic, such as polypropylene, with a rubbery material, such as ethylene-propylene rubber. The rubbery material can optionally be vulcanized.

The relative proportion of thermoplastic to rubbery material in a TEO can range from about 15% by weight thermoplastic to about 85% thermoplastic, and about 85% rubbery material to about 15% rubbery material, respectively. TEOs are typically formulated to produce the desired end-use characteristics. A TEO with a higher amount of thermoplastic can be more brittle. TEO having a high amount of rubbery material will tend to have properties more similar to the pure rubber. In embodiments of the present disclosure wherein the laser-marked article is to be used as a release liner, various TEOs may be selected to provide the liner with physical characteristics suitable to permit the liner to be peeled from a layer of PSA after the PSA has been adhered to a substrate. In some embodiments, TEO comprises from about 30% to about 70% by weight thermoplastic and about 70% to about 30% rubbery material or from about 40% to about 60% by weight thermoplastic and about 60% to about 40% by weight rubbery material.

Suitable commercially available TEOs include those available under the DEXFLEX trade name from D & S Plastics Intl. (Auburn Hills, Mich.), those under the ALCRYN trade name available from DuPont Co. (Wilmington, Del.), those under the MULT-FLEX trade name available from Multibase (Copley, Ohio), and those under the POLYTROPE TPP trade name available from A. Schulman (Akron, Ohio). The grade of TEO is selected for the type of processing that will be used to make the release liner, and is preferably an extrusion grade, such as DEXFLEX SB-814 available from D & S Plastics Intl. Commercially available TEOs may include other additives such fillers, processing aids, plasticizers, and the like.

Multilayered articles according to the present disclosure can be made by known processes such as blown film extrusion or coextrusion for films having multiple layers and sheet extrusion or coextrusion. The films can be made in thicknesses of about 0.0005 inch (0.013 mm) to about 0.010 inch (0.25 mm), and preferably in thicknesses of about 0.001 inch (0.025 mm) to about 0.008 inch (0.2 mm). Thinner films may be desired for cost considerations, while thicker films can provide increased tear resistance, tensile strength, and the like. In some embodiments, a multilayered article may be made first by extrusion or co-extrusion, and the resulting surfaces of the extruded article may be subsequently coated with one or more additional layer of material.

Layers of release agent can be applied during the film manufacturing process before it is heat set, and by known in-line coating or by off-line processes (after manufacturing and heat setting of the film). Conventional off-line coating processes include roll coating, reverse roll coating, gravure roll coating, reverse gravure roll coating, brush coating, wire-wound rod (Meyer rod) coating, spray coating, air knife coating, or dipping which can be from solvent based solutions, solventless or water based emulsions.

While surface modification of the base polymer film prior to coating is not required, the surface or surfaces of the base polymer film may be modified before application of the coatings of the present disclosure. Conventional surface modification techniques include corona treatment to enhance coating adhesion. The corona treatment or other surface modification should be sufficient to permit wetting out of the coating. In addition, primer or other intermediate layers can optionally be used between the polymer film and the release coating.

Additives may be blended into the polymer resin prior to extrusion, or they may be added directly to the extruder. Exemplary additives include fillers, colorants (e.g., dyes or pigments), slip agents, anti-blocking agents, processing aids, laser-sensitive pigment (e.g., titanium dioxide) and the like. Colorants are typically used in amounts of about 0.1% to about 5% by weight of the film composition, and in some embodiments from about 0.3% to about 3%.

Anti-blocking agents are particularly useful for outer layers of polyethylene to prevent sticking or blocking between layers of polyethylene when the extruded film is wound onto a roll. Useful materials include diatomaceous earth either by itself or in a low density polyethylene binder. Anti-blocking agents may be included in amounts of from about 1% to about 20% by weight of the polyethylene resin, and preferably in amounts of from about 3% to about 8%.

While polyethylenes are useful as the main polymer component in the laser-markable layer of the articles described herein, they are also useful as processing aids to enhance the extrusion and film flatness of TEO resins. Various polyethylenes can optionally be blended with the TEO to provide the resulting film with desired release characteristics. In such applications, any type of polyethylene may be used, including low density polyethylene and linear low density polyethylene. The polyethylenes can be used in amounts from about 1% to 99% by weight, and in some embodiments, in amounts of about 15% or greater.

In one embodiment, a laser-markable article is provided comprising a laser-markable layer of TEO and titanium dioxide to which a release coating or layer is or can be applied. The TEO in the laser-markable layer can be mixed or blended with one or more other polymers such as polyethylene. In such an embodiment, TEO is present in the laser-markable layer at a concentration from about 5% by weight to about 100% by weight TEO, and more preferably from about 10% to about 100% TEO. The selection of the relative amounts of TEO and other polymer may be determined by those of ordinary skill in the art by knowing the end properties needed for the release liner, e.g., tensile strength, tear resistance, etc. The release coating (described in more detail below) is or can be applied to one or both sides of the TEO film core, depending upon the intended use and the release characteristics desired. When included, a layer of release agent is in the form of a layer that can constitute from about 7% to about 15% of the total thickness of the release liner.

When included with a PEO, polyethylene may comprise LDPE, MDPE, HDPE or a blend of two or more of the foregoing. The selection of the material depends upon the desired release properties. Polyethylenes of different densities can be blended together, or they can be blended with ethylene co-polymers to provide the desired properties. For example, a blend of high density polyethylene with a low density polyethylene can be used to make a medium density polyethylene having intermediate release values between high and low density polyethylenes.

Another useful polyethylene for use with TEO is a very low density polyethylene formed as a copolymer of ethylene and an alpha olefin having from about 3 to about 10 carbon atoms using a metallocene polymerization catalyst. Suitable alpha-olefins include butene-1, hexene-1, octene-1, and combinations thereof. The copolymers have a density of less than about 0.90 g/cc, preferably less than about 0.89 g/cc, and more preferably, less than about 0.88 g/cc. The copolymers also have a narrow molecular weight distribution as defined by having a polydispersity of about 1 to about 4, and preferably about 1.5 to about 3.5. The polydispersity is defined as the ratio of the weight average molecular weight to the number average molecular weight.

Additionally, the copolymers can be characterized by a composition distribution breadth index (referred to hereinafter as "CDBI"). The CDBI is defined as the weight percent of the copolymer molecule having a co-monomer content within 50 percent (i.e., +/−50%) of the median total molar co-monomer content. The CDBI and the method for its determination is described in U.S. Pat. No. 5,206,075. The CDBI of suitable copolymers is preferably greater than 70% and more preferably greater than 80%. Suitable copolymers are commercially available from Exxon Chemical Co. under the EXACT tradename and from Dow Chemical Co. under the ENGAGE trade name.

Release agent is included in the articles of the present disclosure to provide a means to "release" or separate a multilayered laser-marked article from a sticky material such as a PSA. A release agent's ability to provide release can be determined by known testing methods such as the peel testing method described in the Examples herein. Suitable release agents for use in the various embodiments are those that retain their ability to provide release after exposure to laser radiation used to mark a laser-markable layer. Suitable release agents may comprise any of a variety of know release agents such as are described in various sources including patent literature. Release agents include polyolefin (e.g., polyethylene or polypropylene as described in U.S. Pat. No. 6,982,107), silicones (e.g., polysiloxanes), fluorosilicons (e.g., as in U.S. Pat. No. 4,968,766 to Kendziorski), perfluoroethers (e.g., U.S. Pat. No. 4,830,910 to Larson, U.S. Pat. No. 4,472,480 to Olson), fluorocarbons (e.g., U.S. Pat. No. 7,345,123 to Kumar)), polymers with long alkyl side chains (U.S. Pat. No. 6,660,354 B2 to Suwa), and the like.

Release agents, including those previously mentioned, are commercially available from suppliers, including Momentive Performance Materials (Albany, N.Y.), Dow Corning under its SYL-OFF® brand (Midland, Mich.), Wacker Silicones (Wacker Chemical Corporation, Adrian, Mich.), Evonik Goldschmidt Corporation (Hopewell, Va.), and Bluestar Silicones USA Corp. (Rock Hill, S.C.) etc. Release coated liners are commercially available from Loparex (Willowbrook, Ill.), Mondi Akrosil, LLC. (Menasha, Wis.), Mitsubishi Polyester Film, Inc., (Greer, S.C.), Huhtamaki (Forchheim, Germany), Siliconature (Chicago, Ill.), and other companies.

Release agents can be applied to the laser-markable layer as solvent or water-based coatings, solventless coatings, hot melt coatings, or they can be co-extruded with the laser-markable layer using conventional processes. Solvent and water-based coatings are typically applied by processes such as roll coating, knife coating, curtain coating, gravure coating, wound rod coating, and the like. Solvent or water is removed by drying in an oven, and the coating is optionally cured in the oven. Solventless coatings include 100% solids compositions such as silicones or epoxy silicones which are applied using the same types of processes used for solvent based coatings. The coatings may be cured by exposure to ultraviolet light.

Optional steps may be desired prior to the application of a release agent including priming or surface modification (e.g., corona treatment) of the laser-markable layer. Hot melt coatings such as polyethylenes or perfluoroethers are typically 100% solids coatings which are heated and then applied through a die or with a heated knife. Hot melt coatings may be applied by co-extruding the release material with the laser-markable layer.

As a release liner, adhesive (e.g., PSA) is applied to one or both of the release agents. The amount of release force, e.g., the force required to remove the liner from the adhesive, can range from almost zero to about 500 grams per centimeter or higher, as determined by a peel test method. When the release force is on the higher end of the range, i.e., above about 300 grams per centimeter, it may be difficult to start removal of the liner and to continue the removal of the liner once a part has been removed from the adhesive. The lower end of the removal force range, e.g., less than about 50 grams per centimeter is more typical with silicone coatings. The release layer of a release liner according to the present disclosure exhibits a release value of less about 500 grams per centimeter width, less than about 100 grams per centimeter, or less than about 20 grams per centimeter width.

The release agents on each side of the article may be the same or they may be different to provide a differential release. For differential release, the release agent will have a higher release force on one side than the other. For example, one side of an article may be coated with a silicone release agent having a release force from a pressure sensitive adhesive of no more than 100 grams per centimeter of width and the other side may have a silicone release agent having a release force of 300 grams per inch of centimeter. In some applications, differential release ensures that the PSA will adhere more tightly to one side of the liner than the other so that when a roll of the multilayered laser-marked article is unwound, the adhesive consistently stays on the same side of the article.

The multilayered laser-marked article described herein is useful with any type of PSA. This includes PSAs based on acrylate or acrylics, polyesters, silicones, block copolymers, ethylene vinyl acetate, and the like. The selection of the release agent may depend upon the type of PSA to which it is adhered. For example, release layers of polyethylene, polypropylene, perfluoroethers, and silicone are useful with acrylate pressure-sensitive adhesives, and perfluoroethers are useful for silicone pressure-sensitive adhesives.

Useful PSAs include acrylic adhesives, natural rubber adhesives, tackified block copolymer adhesives, polyvinyl acetate adhesives, ethylene vinyl acetate adhesives, silicone adhesives, polyurethane adhesives, thermosettable pressure-sensitive adhesives such as epoxy acrylate or epoxy polyester pressure-sensitive adhesives, and the like. These types of pressure-sensitive adhesives are known in the art and are described in the *Handbook of Pressure Sensitive Adhesive Technology*, Satas (Donatas), 1989, 2nd edition, Van Nostrand Reinhold, as well as in the patent literature. PSAs may also include additives such as cross-linking agents, fillers, gases, blowing agents, glass or polymeric microspheres, silica, calcium carbonate fibers, surfactants, and the like. The additives are included in amounts sufficient to effect the desired properties.

In some embodiments, heat-stable PSAs may be used with the multilayered laser-marked article of the present disclosure including acrylate pressure-sensitive adhesives such as, for example those described in Re 24,906 (Ulrich), U.S. Pat. No. 4,181,752 (Martens et al.), U.S. Pat. No. 4,818,610 (Zimmerman et al.). In some embodiments, silicone pressure-sensitive adhesives may be used. Adhesives can be purchased commercially or prepared using known methods including emulsion polymerization, solvent polymerization, e-radiation polymerization, ultraviolet light polymerization, and the like. Typically, acrylate adhesives are homopolymers and copolymers of monofunctional unsaturated acrylic or methacrylic acid ester monomers of non-tertiary alcohols having from about 1 to about 20 carbon atoms, and preferably from about 4 to about 12 carbon atoms. A co-monomer may optionally be included to improve the cohesive strength of the adhesive. Such reinforcing co-monomers useful in making the copolymers typically have a higher homopolymer glass transition temperature than the glass transition temperature of the acrylic acid ester homopolymer.

Suitable acrylic acid ester monomers include 2-ethylhexyl acrylate, isooctyl acrylate, isononyl acrylate, n-butyl acrylate, decyl acrylate, dodecyl acrylate, octadecyl acrylate, and mixtures thereof. Useful reinforcing co-monomers include acrylic acid, methacrylic acid, itaconic acid, acrylamide, substituted acrylamides, N-vinyl pyrrolidone, N-vinyl caprolactam, isobornyl acrylate, and cyclohexyl acrylate.

In a typical process to make pressure sensitive adhesive transfer tapes, an adhesive composition is coated onto a laser-marked article, as previously described. The adhesive is cured to form a gelled film on the laser-marked article, and the article with the adhesive is rolled up into a large roll. Alternatively, the adhesive may be coated and cured on one liner, and then transferred onto a different liner before converting. The adhesive coated sheet is then converted into narrow rolls by slitting the large roll and winding the narrow width tape onto cores for customer use. The liners of the present disclosure can also be used with foam tapes such as 5605 and 5344

Acrylic Foam Tapes available from 3M Company (St. Paul, Minn.), as well as double coated tapes.

Regarding the laser, commercially available lasers are suitable for the process described herein. In some embodiments, a suitable laser device emitting ultraviolet (UV) or visible electromagnetic radiation is used. In various embodiments, a laser emitting radiation having a wavelength less than about 550 nm is suitable, and in some embodiments, less than about 360 nm. In some presently preferred embodiments, the laser radiation from the first source of laser radiation comprises electromagnetic radiation comprising a wavelength of about 355 nm. In other particular exemplary embodiments, the laser radiation from the first source of laser radiation comprises electromagnetic radiation comprising a wavelength of about 532 nm.

Exemplary embodiments of coating compositions and methods of making and using such compositions are further illustrated by the following non-limiting examples, but the particular materials and amounts thereof recited in these examples, as well as other conditions and details, should not be interpreted narrowly or construed to unduly limit this disclosure.

EXAMPLES

Unless otherwise noted, all parts, percentages, ratios, etc. in the Examples and the rest of the specification are by weight. In addition, the following abbreviations and materials are used in the Examples below:

A 355 nm laser (commercially available as Coherent Avia, from Coherent, Inc. Santa Clara, Calif.) was directed through a scanhead and f-theta lens (commercially available as Lightning XP, from Cambridge Technology, Inc., Lexington Mass.). The pulse width of the laser was about 40 ns and the focused laser spot size was about 100 microns. The laser output and scanning conditions varied in repetition rates from 180 kHz to 110 kHz, in pulse energies of 65 microjoules to 180 microjoules, and in scanning speeds of the laser spot across the surface from 11.6 meters per second to 8.5 meters per second. The laser output was incident from the liner side of 3M Scotchcal™ ElectroCut™ Marking Film #7725-10 (commercially available from 3M Company, St. Paul, Minn.). The Marking Film construction is a white polyvinyl chloride (PVC) film, clear adhesive layer, and clear polyethylene terephthalate (PET) liner.

Example 1

In Example 1, the clear PET liner was removed from the Marking Film and it was replaced with a multilayer polyethylene (PE) liner. The multilayer liner construction was a coextruded three-layer polyolefin film where the layers were approximately 25 microns of Dow 640i low density polyethylene (LDPE, available from Dow Chemical Company, Midland, Mich.), 50 microns of Dow 640i LDPE with 1% by weight Standridge 11937 white concentrate (available from Standridge Color Corporation, Social Circle, Ga.), and 25 microns of Dow DMDH 6400 high density polyethylene (HDPE).

The multilayer PE liner was replaced so that the HDPE layer contacted the clear adhesive (though it could have been replaced with LDPE layer contacting the clear adhesive). The laser output was controlled and directed over the surface to create patterns of markings. The laser-made markings were clearly visible. The replaced PE liner was separated from the adhesive layer. The laser-made markings were clearly visible in the PE liner, and the laser-made markings were clearly visible through the clear adhesive in the white PVC film. After the marked PE liner was separated from the adhesive layer, it was very difficult, if not impossible to reposition the liner and film so that the markings in the two layers were precisely aligned exactly as before separation of the marked PE liner from the adhesive layer.

Figure 5:
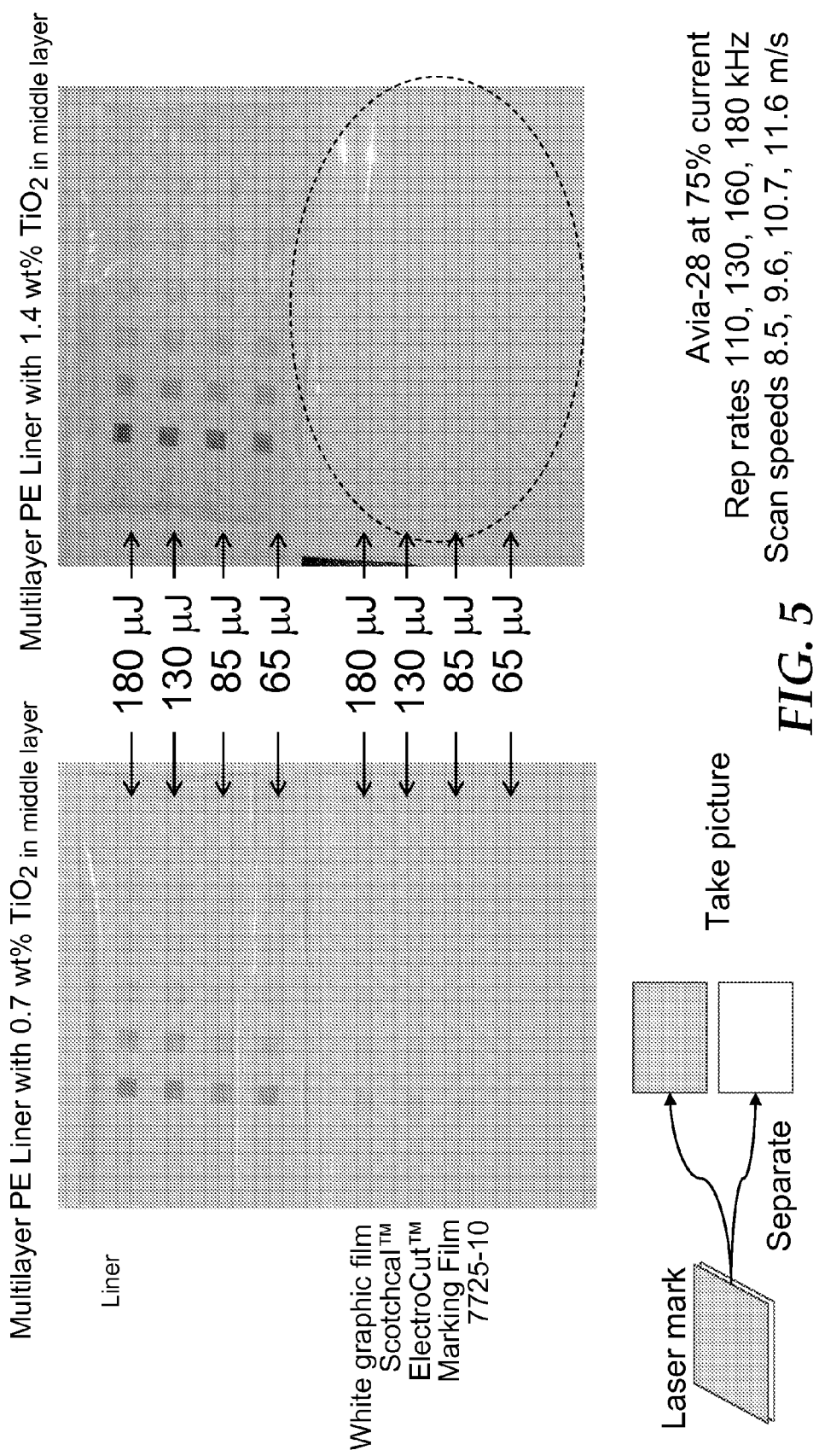
FIG. 5 provides photographs of exemplary laser-marked release liners and adhesive films of exemplary laser-marked multilayered films after exposure to various laser powers and separation of the release liner from the adhesive film.

FIG. 5 shows photographs of the exemplary laser-marked multilayer film article after separating the release liner (liner) from the adhesive film (white graphic film). The effect of laser power and titanium dioxide concentration (as a weight percentage of the entire first laser-markable layer comprised of the organic polymer and the light-sensitive pigment, titanium dioxide).

Comparative Example 1

In Comparative Example 1, the clear PET liner was removed from the Marking Film and it was replaced with a multilayer polyethylene (PE) liner. The multilayer liner construction was a coextruded three-layer polyolefin film where the layers were approximately 25 microns of Dow 640i low density polyethylene (LDPE, available from Dow Chemical Company, Midland, Mich.), 50 microns of Dow 640i LDPE with 2% by weight Standridge 11937 white concentrate (available from Standridge Color Corporation, Social Circle, Ga.), and 25 microns of Dow DMDH 6400 high density polyethylene (HDPE). The multilayer PE liner was replaced so that the HDPE layer contacted the clear adhesive (though it could have been replaced with LDPE layer contacting the clear adhesive).

The laser output was controlled and directed over the surface to create patterns of markings. The laser-made markings were clearly visible. The replaced PE liner was separated from the adhesive layer. The laser-made markings were clearly visible in the PE liner, yet there were no laser-made markings in the clear adhesive nor in the white PVC film.

Comparative Example 2

In Comparative Example 2, the clear PET liner was removed from the Marking Film and it was replaced with a clear multilayer polymer liner. The multilayer liner construction was a coextruded three-layer polyolefin film where the layers were approximately 75 microns of Dow 640i low density polyethylene (LDPE, available from Dow Chemical Company, Midland, Mich.), and 25 microns of ExxonMobil Exact™ 5181 Plastomer (available from ExxonMobil Chemical Company, Houston, Tex.). The multilayer polymer liner was replaced so that the Plastomer layer contacted the clear adhesive (though it could have been replaced with LDPE layer contacting the clear adhesive).

The laser output was controlled and directed over the surface to create patterns of markings. The laser-made markings were clearly visible. The clear polymer liner was separated from the adhesive layer. The laser-made markings were clearly visible through the clear adhesive in the white PVC film, yet there were no laser-made markings in the clear polymer liner.

Although changes or modifications, both foreseeable and unforeseeable, can be made to the described embodiments by one of ordinary skill in the art, such changes and modifications, however, are not to be construed as outside the scope and spirit of the invention. Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the exemplary embodiments of the present disclosure. Furthermore, the particular features, structures, materials, or characteristics may be combined in any suitable manner in one or more embodiments.

Also, as used in this specification and the appended claims, the singular forms "a", "an", and "the" encompass embodiments having plural referents (i.e. mean "at least one"), unless the content clearly dictates otherwise. As used in this specification and the appended claims, the term "or" is generally employed in its sense including "and/or" unless the content clearly dictates otherwise.

Moreover, while the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g. 1 to 5 includes 1, 1.5, 2, 2.75, 3, 3.80, 4, and 5). Furthermore, unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those of ordinary skill in the art utilizing the teachings disclosed herein.

Additionally, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A multilayered article comprising:
a laser-markable release liner further comprising a first laser-markable layer comprised of at least a first organic polymer and at least a first light-sensitive pigment, a first release layer adjacent to an external major surface of the laser-markable release liner and comprised of at least one release agent, and a second release layer comprised of at least one release agent and adjacent to a second major surface of the laser-markable release liner opposite the first release layer, the first release layer being substantially transparent to the laser radiation; and
a laser-markable adhesive film further comprising a second laser-markable layer comprised of at least a second organic polymer and at least a second light-sensitive pigment, and an adhesive layer comprising at least one pressure sensitive adhesive adjacent to a major surface of the laser-markable adhesive film, wherein the adhesive layer is positioned between the laser-markable release liner and the second laser-markable layer, further wherein the second release layer is interposed between the first laser markable layer and the adhesive layer, wherein the laser-markable release liner and the laser-markable adhesive film each include at least one visually perceptible marking.

2. The multilayered article of claim 1, wherein the at least one visually perceptible marking of the laser-markable release liner is in registration with the at least one visually perceptible marking of the laser-markable adhesive layer.

3. The multilayered article of claim 1, wherein the at least one visually perceptible marking of the laser-markable release liner is not in registration with the at least one visually perceptible marking of the laser-markable adhesive layer.

4. A process, comprising:
providing a multilayered article comprising
a laser-markable release liner further comprising a first laser-markable layer comprised of at least a first organic polymer and at least a first light-sensitive pigment, a first release layer adjacent to an external major surface of the laser-markable release liner and comprised of at least one release agent, and a second release layer comprised of at least one release agent and adjacent to a second major surface of the laser-markable release liner opposite the first release layer; and
a laser-markable adhesive film further comprising a second laser-markable layer comprised of at least a second organic polymer and at least a second light-sensitive pigment, and an adhesive layer comprising at least one pressure sensitive adhesive adjacent to a major surface of the laser-markable adhesive film, wherein the adhesive layer is positioned between the laser-markable release liner and the second laser-markable layer, further wherein the second release layer is interposed between the first laser markable layer and the adhesive layer; and
laser-marking the laser-markable release liner and the laser-markable adhesive film by directing laser radiation from a first source of laser radiation into the multilayered article through at least the first release layer to induce an interaction between the first light-sensitive pigment and the first organic polymer in the laser-markable release liner, and the second light-sensitive pigment and the second organic polymer in the laser-markable adhesive film, to form at least one visually perceptible marking in each of the laser-markable release liner and the laser-markable adhesive film, the first release layer and the second release layer being substantially transparent to the laser radiation.

5. The process of claim 4, wherein the at least one visually perceptible marking in the laser-markable release liner is formed in registration with the at least one visually perceptible marking in the laser-markable adhesive film.

6. The process of claim 4, wherein at least one of the at least one visually perceptible marking in the laser-markable release liner or the at least one visually perceptible marking in the laser-markable adhesive film comprises a plurality of markings.

7. The process of claim 4, wherein one or both of the first light sensitive pigment and the second light sensitive pigment comprises metal oxide particles selected from titanium dioxide, tin oxide, indium tin oxide, and combinations thereof.

8. The process of claim 4, wherein one or both of the first organic polymer and the second organic polymer is selected from the group consisting of polyethylene terephthalate, polyolefin, thermoplastic elastomeric olefin and combinations thereof.

9. The process of claim 4, wherein at least one of the at least one release agent of the first release layer, or the at least one release agent of the second release layer, comprises a material selected from the group consisting of polyolefin, silicones, fluorosilicones, perfluoroethers, fluorocarbons, polymers with long alkyl side chains, and combinations of two or more of the foregoing.

10. The process of claim 9, wherein the first release layer comprises a first polyolefin release agent, and the second release layer comprises a second polyolefin release agent different from the first polyolefin release agent.

11. The process of claim 10, wherein the first release layer comprises low density polyethylene, the first organic polymer comprises high density polyethylene, and the second release layer comprises medium density polyethylene; optionally wherein both the first light-sensitive pigment and the second light sensitive pigment comprise titanium dioxide.

12. The process of claim 4, further comprising:
rolling the multilayered article into a rolled configuration so that the at least one pressure sensitive adhesive becomes releasably adhered to the first release layer, wherein the at least one pressure sensitive adhesive is more firmly adhered to the second release layer.

13. The process of claim 4, wherein the multilayered article comprises a material selected from the group consisting of nonwoven materials, woven materials, cellulosic materials, films and combinations of two or more of the foregoing.

14. The process of claim 4, wherein the first light sensitive pigment comprises titanium dioxide present at a concentration of less than about 1.5% by weight based on the combined weight of the first organic polymer and the first light-sensitive pigment.

15. The process of claim 4, wherein the laser radiation from the first source of laser radiation comprises electromagnetic radiation comprising a wavelength of about 355 nm.

16. The process of claim 4, wherein the laser radiation from the first source of laser radiation comprises electromagnetic radiation comprising a wavelength of about 532 nm.

17. A self-adhesive article made according to claim 4, wherein the self-adhesive film is a graphic film.

18. A process, comprising:
providing a multilayered article comprising
a laser-markable release liner further comprising a first laser-markable layer comprised of at least a first organic polymer and at least a first light-sensitive pigment, a first release layer adjacent to an external major surface of the laser-markable release liner and comprised of at least one release agent, and a second release layer comprised of at least one release agent and adjacent to a second major surface of the laser-markable release liner opposite the first release layer; and
a laser-markable adhesive film further comprising a second laser-markable layer comprised of at least a second organic polymer and at least a second light-sensitive pigment, and an adhesive layer comprising at least one pressure sensitive adhesive adjacent to a major surface of the laser-markable adhesive film, wherein the adhesive layer is positioned between the laser-markable release liner and the second laser-markable layer, further wherein the second release layer is interposed between the first laser markable layer and the adhesive layer; and
laser-marking the laser-markable release liner by directing laser radiation from a first source of laser radiation into the multilayered article through the first release layer to induce an interaction between the first light-sensitive pigment and the first organic polymer in the laser-markable release liner to form at least one visually perceptible marking in the laser-markable release liner, the first release layer being substantially transparent to the laser radiation from the first source of laser radiation; and
laser-marking the laser-markable adhesive film by directing laser radiation from a second source of laser radiation into the multilayered article through the laser-markable adhesive film to induce an interaction between the second light-sensitive pigment and the second organic polymer in the laser-markable adhesive film to form at least one visually perceptible marking in the laser-markable adhesive film, the laser-markable adhesive film being transparent to at least a portion of the laser radiation from the second source of laser radiation.

19. The process of claim 18, wherein the at least one visually perceptible marking in the laser-markable release liner is not formed in registration with the at least one visually perceptible marking in the laser-markable adhesive film.

20. The process of claim 18, wherein the laser radiation from the first source of laser radiation comprises electromagnetic radiation comprising a wavelength of about 355 nm, and the laser radiation from the second source of laser radiation comprises electromagnetic radiation comprising a wavelength of about 532 nm.

* * * * *